United States Patent Office 3,490,995
Patented Jan. 20, 1970

3,490,995
PROCESS FOR THE BIOSYNTHESIS OF CELL-BOUND PULLULANASE BY AEROBACTER AEROGENES
Kurt Wallenfels and Hans Bender, Freiburg, Breisgau, Germany, assignors to Farbwerke Hoechst Aktiengesellschaft vormals Meister Lucius & Bruning, Frankfurt am Main, Germany, a corporation of Germany
No Drawing. Filed Feb. 1, 1967, Ser. No. 613,090
Claims priority, application Germany, Feb. 5, 1966, F 48,357
Int. Cl. C12k *1/00;* C12d *13/06;* C07g *7/02*
U.S. Cl. 195—66                                    2 Claims

ABSTRACT OF THE DISCLOSURE

The biosynthesis of cell-bound pullulanase by continuous or discontinuous cultivation of *Aerobacter aerogenes* ATCC 15050 in the presence of maltose and/or pullulane or glucose and maltose as carbon source.

---

The present invention relates to a process for the biosynthesis of cell-bound pullulanase by *Aerobacter aerogenes* ATCC 15050.

The enzyme pullulanase of the strain *Aerobacter aerogenes* ATCC 15050 splits 1,6-glycosidic linkages in α-glucanes in specific manner if adjacent 1,4-linkages are present at the same time. Substrates for the enzyme are the α-glucane pullulane which is formed by the fungus *Pullularia pullulans,* further amylopectin and glycogen. While pullulanase completely degrades pulluane to matotriose, in amylopectin and glycogen it splits only the α-1,6 linkages, whereby these carbohydrates become accessible to complete degradation by amylases. In its splitting specificity, the Aerobacter enzyme resembles the "R-enzyme" obtained from plants (J. Chem. Soc. 1951, page 1451).

Pullulanase is excreted into the culture filtrate in the late logarithmic growth phase of *Aerobacter aerogenes* ATCC 15050 on batchwise cultivation in simple salt solutions with maltose or pullulane as carbon source. From the culture filtrate it can be isolated by known methods. However, enrichment and purification of the cell-free enzyme are unsatisfactory for several reasons:

(a) The culture medium for maximum enzyme yields is relatively expensive owing to its peptone content;

(b) The production of larger amounts of enzyme requires cumbersome operations with large quantities of liquids having a relatively low enzyme content;

(c) The consumption of suitable precipitating agents is high, and an extensive apparatus is required for precipitating the enzyme at low temperatures.

Now, we have found that by modification of the cultivation conditions the excretion of pullulanase during cultivation can be prevented and pullulanase can be obtained in higher yields than in the hitherto used methods by (a) effecting the cultivation of *Aerobacter aerogenes* ATCC 15050 in continuous manner, or (b) by using, with discontinuous fermentation, simultaneously maltose and glucose as the carbon source.

(a) In continuous fermentation, a simple salt solution like that proposed by Czapek-Dox is suitably used as culture solution. As the carbon source, there may be used, for example, maltose or pullulane, or even glycerin to which a small amount of maltose or pullulane is added for inducing the synthesis of pullulanase. The total concentration of the carbon source amounts to about 0.1–0.4%, preferably to about 0.25%; if combined carbon sources are used, the concentration of the inductor should amount to 1/6 to 1/3, preferably about 1/4, of the total carbon source.

With an optimum dilution rate, cell suspensions are obtained in which the pullulanase activity, referred to the weight of the dry cells, is at least twice as high as the activity excreted in the hitherto used batch cultivation into the culture filtrate by the same amount of cells. Variations in enzyme content of the cells in the steady state of continuous fermentation are small, and over prolonged periods of cultivation at least 80% of the total pullulanase activity are cell-bound (Example 1).

(b) The same effect is obtained in discontinuous cultivation, when simultaneously using maltose and glucose as the carbon source. The total concentration should amount to 0.4–1.2%, preferably to about 0.8%; the ratio of glucose to maltose should be between 1:2 and 2:1, preferably about 1:1. During the di-auxetic growth-phase, glucose is first consumed, while the synthesis of pullulanase is completely stopped. Formation of pullulanase sets in with the beginning of maltose consumption. In this variation of the process, too, pullulanase remains to 80% cell-bound (Example 2).

When the carbon sources mentioned under (a) are used in the first growth-phase of the batch-wise cultivation of *Aerobacter aerogenes,* it is necessary to discard the outflow of the first hours of the subsequent continuous cultivation, because the enzymatic activity is at first cell-free. The optimum quantity of cell-bound enzyme is produced only after some hours of continuous cultivation. If, however, approximately equal amounts of maltose and glucose according to method (b) are used already in the first growth-phase of the batch-wise cultivation, pullulanase is obtained in cell-bound form from the beginning of the subsequent continuous cultivation (Example 3).

The isolation of the enzyme from the cell material can be effected according to known methods. In the present case, however, it is particularly advantageous to use surface-active substances such as ionic or non-ionic detergents and invert soaps. If, for example, a concentrated suspension of freshly harvested cells is shaken with such a solution, the total pullulanase activity is set free, whereas the content of simultaneously extracted other macromolecular cell components remains very low.

The enzymatic activity of pullulanase during fermentation and extraction is determined by measuring the reduction value of the maltotriose units formed upon splitting of pullulane. The reduction value is suitably determined according to the method described by Nelson (J. Biol. Chem. 153, 375 (1944)). The pullulanase unit is defined as the quantity of enzyme which cleaves 1 m$\mu$-mol of maltotriose from pullulane within one minute, at 30° C. and pH 5.0.

The pullulanase can be enriched from the solutions of the surface-active substances by the known methods of enzyme precipitation and can be purified e.g. by fractional precipitation or by column chromatography. After dialysis against a diluted buffer solution at pH 6.0 to 7.2, stable dry preparations of pullulanase can be obtained by freeze-drying.

The following examples illustrate the invention but they are not intended to limit it thereto.

EXAMPLE 1

Continuous cultivation of the strain *Aerobacter aerogenes* ATCC 15050 was carried out in a modified medium according to Czapek-Dox having the following composition: 0.3% of $NaNO_3$, 0.1% of $KH_2PO_4$, 0.05% of $MgSO_4 \cdot 7H_2O$, 0.05% of KCl, 0.05% of Na-citrate, and 0.025% of $FeSO_4 \cdot 7H_2O$. The citrate was added in order to stabilize the bi-valent iron which is required for the growth and synthesis of pullulanase. The concentration of the carbon source was between 0.1% and 0.4%, preferably 0.25%. Either maltose or pullulane alone was used as the carbon source, or a combined carbon source was ised containing 3 parts of glycerin and 1 part of maltose or pullulane for inducing pullulanase synthesis. The carbon sources were sterilized separately in concentrated solutions. The batch-wise first growth-phase of the cultivation took place in the same medium with 0.6% of carbon source, preferably maltose or pullulane. The cultivation temperature was suitable at 30° C. The cultivation conditions for a 10 liter fermenter were: stirrer 500 r.p.m., air 500 liters/hour. As inoculum 2 ml./100 ml. of a 20 hours old pre-culture of the strain grown in the same medium with 0.6% of carbon source, preferably maltose or glycerin, were used. Cultivation was continued batchwise until the cell density was 2 mg. of dry cells/ml. Cultivation was then switched to continuous operation. The rate of dilution was between 0.1 and 0.3 hour$^{-1}$, preferably 0.2 hour$^{-1}$. The outflow of the first 10 hours of the continuous cultivation was discarded. The cell mass was separated by centrifugation and worked up without any other treatment.

Enzyme yield: 0.3–0.4 pullulanase units/ml. at a cell density of 1–1.5 mg. of dry cells/ml. Maximum cell-free activity was 20% of the cell-bound activity.

EXAMPLE 2

The salt solution according to Czapek-Dox described in Example 1 was used as medium for the manufacture of cell-bound pullulanase in batch cultures. As the carbon source, equal parts of maltose and glucose in concentrations of 0.2%–0.6% each, preferably 0.4% each, were used; sterilization of the sugars was carried out separately. Cultivation of the pre-culture and inoculation of the stock culture was carried out as described in Example 1. The stock culture was cultivated for 16 to 24 hours, preferably 20 hours, at 30° C., with optimum aeration. The cell mass was separated by centrifugation and worked up without any further treatment.

Enzyme yields: 0.4 to 0.5 pullulanase units/ml. at a cell density of 3–4 mg. of dry cells/ml. Maximum cell-free activity was 20% of the cell-bound activity.

EXAMPLE 3

The batch-wise first growth-phase for the continuous cultivation was allowed to take place as described in Example 1. As carbon source, 0.4% of maltose and 0.4% of glucose were used. At the end of the logarithmic growth phase, cultivation was carried out in continuous operation. The outflow was utilized from the beginning. The enzyme yield corresponded to that indicated in Example 1.

EXAMPLE 4

(a) 10–20 g., preferably 15 g., of fresh bacterial cell mass were suspended in 100 ml. of a 0.1–0.2%, preferably 0.15%, solution of sodium lauryl sulfate in distilled water and the whole was shaken for 12–18 hours, preferably for 15 hours, at 30° C., in a 1 l. flask. The cells were then separated by centrifugation and the clear supernatant solution containing pullulanase was stored at 0–4° C. until further treatment.

Enzyme yields: 95% of the total measurable pullulanase were extracted. 6–8 pullulanase units/ml. of supernatant/ 0.130–0.150 mg. of protein.

(b) The process was carried out as described in Example 4(a), but the cells were shaken in an aqueous solution of Triton X–100 (octylphenol-decaethylene-glycol ether) having a strength of 0.4–10%, preferably 0.5%.

Enzyme yields: 95% of the total measurable pullulanase were extracted. 6–8 pullulanase units/ml. of supernatant/ 0.130–0.150 mg. of protein.

(c) The process was carried out as described in Example 4(a), but the cells were shaken in an aqueous solution of 1–4×10$^{-3}$ mol, preferably 2×10$^{-3}$ mol, of n-cetyl-pyridinium chloride.

Enzyme yields: 72% of the total measurable pullulanase were extracted. 5–6 pullulanase units/ml. of supernatant/ 0.120–0.160 mg. of protein.

(d) The process was carried out as described in Example 4(a), but the cells were shaken in an aqueous solution of 1–4×10$^{-3}$ mol, preferably 2×10$^{-3}$ mol, of N-cetyl-N,N,N-trimethyl-ammonium bromide.

Enzyme yields: 72% of the total measurable pullulanase were extracted. 5–6 pullulanase units/ml. of supernatant/ 0.140–0.160 mg. of protein.

We claim:
1. In a process for the manufacture of pullulanase by the cultivation of *Aerobacter aerogenes* in a culture medium in the presence of a carbon source, the improvement which comprises continuously cultivating *Aerobacter aerogenes* ATCC 15050 in the presence of a carbon source selected from the group consisting of maltose, pullulane, and glycerin containing maltose or pullulane, whereby the pullulanase produced is principally cell-bound, and then isolating the enzyme from the cell mass, the total concentration of the carbon source being from about 0.1 to 0.4 percent and, in the case in which glycerin is employed together with maltose or pullulane, the amount of maltose or pullulane being from ⅙ to ⅓ of the total carbon source.

2. In a process for the manufacture of pullulanase by the cultivation of *Aerobacter aerogenes* in a culture medium in the presence of a carbon source, the improvement which comprises continuously cultivating *Aerobacter aerogenes* ATCC 15050 in the presence of a carbon source consisting of glucose and maltose in a ratio of 2:1 to 1:2, whereby the pullulanase formed is principally cell-bound, and then isolating the enzyme from the cell mass, the total concentration of the carbon source being between about 0.4 and 1.2 percent.

References Cited

Bender et al., Methods in Enzymology, vol. VIII, pp. 555–559 (1966).

Wallenfels et al., Biochemical and Biophysical Research Communications, vol. 22, No. 3, pp. 254–261 (1966).

Bender et al., Biochemische Zeitschrift 334, 79–95 (1961).

LIONEL M. SHAPIRO, Primary Examiner

U.S. Cl. X.R.

195—100